(12) United States Patent
Hamilton, II et al.

(10) Patent No.: US 10,884,904 B2
(45) Date of Patent: *Jan. 5, 2021

(54) AUTOMATIC COGNITIVE ADAPTATION OF DEVELOPMENT ASSETS ACCORDING TO REQUIREMENT CHANGES

(71) Applicant: International Business Machines Corporation, Armonk, NY (US)

(72) Inventors: Rick A. Hamilton, II, Charlottesville, VA (US); James R. Kozloski, New Fairfield, CT (US); Agueda Martinez Hernandez Magro, Zapopan (MX); Jose Roberto Mosqueda Mejia, Puruandiro (MX); Jorge Alonso Hernandez Nevarez, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,056

(22) Filed: Oct. 30, 2017

(65) Prior Publication Data

US 2018/0113795 A1 Apr. 26, 2018

Related U.S. Application Data

(63) Continuation of application No. 14/990,363, filed on Jan. 7, 2016, now Pat. No. 9,804,954.

(51) Int. Cl.
*G06F 9/45* (2006.01)
*G06F 9/445* (2018.01)
(Continued)

(52) U.S. Cl.
CPC ........ *G06F 11/3672* (2013.01); *G06F 11/368* (2013.01); *G06F 11/3684* (2013.01); *G06F 8/34* (2013.01)

(58) Field of Classification Search
CPC .............. G06F 11/3672; G06F 11/368; G06F 11/3684; G06F 8/34
See application file for complete search history.

(56) References Cited

U.S. PATENT DOCUMENTS 6,804,634 B1 10/2004 Holzmann
7,506,312 B1 * 3/2009 Girolami-Rose ......... G06F 8/71
717/101

(Continued)

OTHER PUBLICATIONS

Piyakam Klindee, Test Cases Prioritization for Software Regression Testing Using Analytic Hierarchy Process, 2015, pp. 168-173. https://ieeexplore.ieee.org/stamp/stamp.jsp?tp=&arnumber=7219790 (Year: 2015).*

(Continued)

*Primary Examiner* — Mongbao Nguyen
(74) *Attorney, Agent, or Firm* — Aaron N. Pontikos

(57) ABSTRACT

A cognitive engine is coupled to at least one requirements management tool and at least one quality management tool. The cognitive engine is configured to: transform the test cases and the initial software requirements into test case objects and requirement objects, respectively; link test case objects to corresponding requirements objects based on like attributes; provide a graphical representation showing test case objects linked to corresponding requirements objects; automatically update the graphical representation in response to updated software requirements or new software requirements; and automatically disseminate the graphical representation or the updated graphical representation if the test case effectiveness exceeds a predetermined confidence threshold.

14 Claims, 8 Drawing Sheets

(51) Int. Cl.
*G06F 9/44* (2018.01)
*G06F 11/36* (2006.01)
*G06F 8/34* (2018.01)

(56) References Cited

U.S. PATENT DOCUMENTS

| | | | |
|---|---|---|---|
| 7,735,068 B2 | 6/2010 | Siddaramappa | |
| 7,890,921 B2 | 2/2011 | Munkvold | |
| 8,191,044 B1 | 5/2012 | Berlik | |
| 8,205,191 B1* | 6/2012 | Kolawa | G06F 11/368 717/124 |
| 8,276,123 B1 | 9/2012 | Deng | |
| 8,589,884 B2 | 11/2013 | Gorthi | |
| 8,745,589 B2* | 6/2014 | Arumugham | G06F 11/368 717/125 |
| 8,799,869 B2 | 8/2014 | Grechanik | |
| 8,954,931 B2 | 2/2015 | Wefers | |
| 9,396,094 B2* | 7/2016 | Browne | G06F 11/3676 |
| 9,934,134 B2* | 4/2018 | Cohen | G06F 9/44589 |
| 2006/0190922 A1 | 8/2006 | Chen | |
| 2008/0010542 A1* | 1/2008 | Yamamoto | G06F 11/3672 714/38.1 |
| 2011/0093833 A1 | 4/2011 | Kierans | |
| 2011/0246964 A1 | 10/2011 | Cox, III | |
| 2013/0042222 A1* | 2/2013 | Maddela | G06F 8/70 717/124 |
| 2013/0086556 A1* | 4/2013 | Grechanik | G06F 11/3684 717/126 |
| 2013/0185056 A1* | 7/2013 | Ingram | G06F 40/40 704/9 |
| 2013/0339930 A1* | 12/2013 | Xu | G06F 11/3684 717/125 |
| 2014/0115438 A1 | 4/2014 | Bhatt | |
| 2014/0172512 A1* | 6/2014 | Chandra | G06Q 10/0637 705/7.37 |
| 2014/0245068 A1 | 8/2014 | Agarwal | |
| 2014/0282433 A1* | 9/2014 | Eilam | G06F 11/3676 717/131 |
| 2015/0205704 A1 | 7/2015 | Michelsen | |
| 2015/0242305 A1 | 8/2015 | Akbulut | |
| 2015/0339213 A1* | 11/2015 | Lee | G06F 3/0484 717/125 |
| 2016/0019135 A1* | 1/2016 | Gotlieb | G06F 11/3684 717/124 |
| 2016/0048444 A1* | 2/2016 | Crova | G06F 11/3672 717/124 |
| 2016/0055076 A1* | 2/2016 | Fliek | G06F 11/3672 717/125 |
| 2016/0055079 A1* | 2/2016 | Hanna | G06F 11/3692 717/135 |
| 2016/0179494 A1 | 6/2016 | Pavlov | |
| 2017/0039039 A1* | 2/2017 | Johnson | G06F 8/35 |
| 2017/0091071 A1* | 3/2017 | Chitale | G06F 11/3692 |
| 2017/0139819 A1* | 5/2017 | D'Andrea | G06F 11/3688 |
| 2017/0147481 A1* | 5/2017 | Doss | G06F 11/3684 |
| 2017/0372247 A1* | 12/2017 | Tauber | G06F 11/3668 |

OTHER PUBLICATIONS

D.Nirmala, Automated Testcase Generation for Software Quality Assurance, Jul. 1, 2016, pp. 1-6. https://ieeexplore.ieee.org/stamp/stamp.jsp?tp=&arnumber=7727003 (Year: 2016).*

Manar Abu Talib, Techniques for Quantitative Analysis of Software Quality throughout the SDLC: The SWEBOK Guide Coverage, 2010, pp. 321-327. https://ieeexplore.ieee.org/stamp/stamp.jsp?tp=&arnumber=5489855 (Year: 2010).*

Ana Filipa Nogueira, On the Evaluation of Software Maintainability Using Automatic Test Case Generation, 2014, pp. 300-305. https://ieeexplore.ieee.org/stamp/stamp.jsp?tp=&arnumber=6984138 (Year: 2014).*

Youngki Hong, Requirements Management Tool with Evolving Traceability for Heterogeneous Artifacts in the Entire Life Cycle, 2010, pp. 248-254. https://ieeexplore.ieee.org/stamp/stamp.jsp?tp=&arnumber=5489839 (Year: 2010).*

.S. Yoo, Regression Testing Minimisation, Selection and Prioritisation: A Survey, 2007, pages http://www0.cs.ucl.ac.uk/staff/M.Harman/stvr-shin-survey.pdf (Year: 2007).*

Alessandro Marchetto, A Multi-Objective Technique to Prioritize Test Cases, 2015, pp. 918-938. https://ieeexplore.ieee.org/stamp/stamp.jsp?tp=&arnumber=7362042 (Year: 2015).*

Test Case Management for Improved QA Visibility; Seapine Software; May 5, 2015; http://www.seapine.com/testtrack/test-case-management?utm_source=GoogleAdwords&utm_campaign=TestCaseManagementAd&utm_medium=PaidSearch&utm_content=&gclid=CNjFlf-3mMkCFUo6gQodW6AMZg.

Bai, X., Chen, B., Gong, Y., Ma, B., Design of Intelligent Agents for Collaborative Testing of Service-Based Systems; AST'11; 2011.

Zhang, P., Wang, F., Hu, J., Sorrentino, R.; Towards Personalized Medicine: Leveraging Patient Similarity and Drug Similarity Analytics; AMIA Summits on Translational Science Proceedings 2014, pp. 132-136.

List of IBM Patents or Applications Treated as Related.

Fernandes et al., "Application Quality Management", An Oracle White Paper, Mar. 2010, 19 pages.

Heinonen, S., "Requirements Management Tool Support for Software Engineering in Collaboration", 2006, University of Oulu, Department of Electrical and Information Engineering, Master's Thesis, 91 pages.

Nebut et al., "Automated Requirements-based Generation of Test Cases for Product Families", Proceedings of the 18th IEEE International Conference on Automated Software Engineering, 2003, 4 pages.

* cited by examiner

AUTOMATIC COGNITIVE ADAPTATION OF DEVELOPMENT ASSETS ACCORDING TO REQUIREMENT CHANGES

This application claims priority to U.S. Non-Provisional patent application Ser. No. 14/990,363, filed on Jan. 7, 2016, and issued as U.S. Pat. No. 9,804,954 on Oct. 31, 2017, the entire disclosure of which is incorporated herein by reference.

BACKGROUND

The present invention relates generally to computing and software development, and particularly to an automated system and method for managing software testing.

During the course of developing a software program, one drawback associated with large software development projects relates to the tendency of software developers and testers to work in isolation on the various and sundry software components. As a result, these personnel have been known to develop a variety of test artifacts without leveraging the testing efforts of other development personnel.

In order to address the aforementioned drawback, various collaborative software development tools have been introduced. These development tools may include, e.g., requirements management, quality management, source control management tools, etc.

In some cases, the software development tools are based on the client-server model, with a software development manager program residing on a server. This program was configured to manage access and publication of the software components, test cases, and the test programs used to test the components in accordance with its particular test case(s). The server also typically included a shared repository for storing the components, test cases, and the test programs. Of course, the aforementioned entities may have been developed by multiple developers and testers using a client developer system. The client systems could include any suitable development device (or system) known by those of ordinary skill in the art, such as other server computing systems, desktop computers, workstations, mainframes, hand held computing devices, or telephony devices, etc. To fully appreciate the magnitude of a large scale software development process, it may be helpful to provide an overview of the process flow performed by multiple software developers and testers in a distributed software development environment.

In the beginning of any project, the system architects provide a high level design that specifies, for example, high level system operations, user interfaces (e.g., graphical user interface (GUIs), etc.), messaging, etc. Based on the high level design, the developers specify components (e.g., functions, subroutines, etc.), algorithms, and etc. that implement the operations. While performing these tasks, the software testers may be developing (or at least planning for) the test cases that will be used to test the individual components and the component interfaces.

A component test case is often directed toward the various scenarios under which that component may be executed; for example, the component may be executed by a variety of software programs, in different system settings or configurations, or with a variety of file system attributes, etc. A test case may also specify test component operations under error conditions (such as various invalid settings), to validate the messaging operations of the components. The test cases may further consider interactions of the components with client level, server level and other third party software. The test cases may test the user interface operations.

As alluded to above, the software development process may be carried out with a multiplicity of developers, testers, and managers. As a result, test case documentation and management during all the various phases of the software development process becomes problematic, to say the least. Thus, when the project management team decides to change the software requirements—or add new requirements—all of the test case documentation must be updated to reflect the new requirements. Because this is currently a task that is performed manually, software test teams spend a large amount of time doing requirement analysis tasks and the corresponding test case updates.

To be specific, the task of understanding the impact of a requirement change on all of the various test cases currently requires painstaking human cognitive input. When managing a large software development project, i.e., one that includes a large list of software requirements, the problem of managing the related test cases becomes extremely complex and thus very difficult. One issue relates to the testers themselves; simply stated, different testers have different perspectives and may evaluate the impact of a requirement change quite differently. Thus, testing results may be uneven.

The aforementioned problems are further exacerbated by the tendency of software development teams to use iterative methodologies (e.g., Agile). Because an iterative approach is employed by design, changes to the requirements necessarily occur quite frequently. As a result, the test cases must be frequently updated as well. Moreover, requirement changes may also impact other project assets such as architecture and design documents. Accordingly, these documents must also be updated.

What is needed therefore is a system and method for automatically managing (updating) project assets (e.g., test cases, architecture, designs, etc.) in response to changed or new requirements.

SUMMARY

The present invention addresses the needs described above by providing a system and method for automatically managing and updating project assets such as test cases, architecture, designs, etc. in response to changed or new requirements.

One aspect of the present invention is directed to a tracking system for a software program development. The system includes at least one requirements management tool configured to provide initial software requirements, updated software requirements or new software requirements. At least one quality management tool is coupled to the at least one requirements management tool, the at least one quality management tool being configured to generate test cases corresponding to the initial software requirements, each test case configured to determine if the software program satisfies a corresponding software requirement. A cognitive engine is coupled to the at least one requirements management tool and the at least one quality management tool. The cognitive engine is configured to: (1) transform the test cases and the initial software requirements into test case objects and requirement objects, respectively, (2) link the test case objects to the corresponding requirements objects based on like attributes, (3) provide a graphical representation showing the test case objects linked to the corresponding requirements objects, (4) automatically update the graphical representation in response to updated software requirements or new software requirements, and (5) automatically disseminate the graphical representation or the updated graphical representation if a test case effectiveness calculation exceeds a predetermined confidence threshold.

In one embodiment, the cognitive engine further includes: a monitoring program configured to semantically analyze the updated software requirements or the new software requirements to identify requirement attribute changes; an iteration program configured to iterate the graphical representation or the updated graphical representation to determine which test cases are affected by the requirement attribute changes; and a graph updating program configured to update the graphical representation based on the requirement attribute changes.

In one version of the embodiment, the cognitive engine further includes a test case design program configured to transform the requirement attribute changes into human readable indicia corresponding to a suggested test case, the suggested test case being disseminated to the at least one quality management tool.

In one embodiment, the at least one requirements management tool or the at least one quality management tool include display devices configured to display the graphical representation or the updated graphical representation.

In one version of the embodiment, the graphical representation is displayed as a nodal plot having requirement nodes linked to corresponding test case nodes by linking arcs, each linking arc representing a test case object linked to a corresponding requirements objects based on like attributes.

In one version of the embodiment, the cognitive engine is configured to perform a propagation analysis to determine if the updated graphical representation is in a stable state.

In one version of the embodiment, the propagation analysis is depicted by providing a nodal indicator that moves from node to node until the graphical representation settles into the stable state or remains in an unstable state.

In one version of the embodiment, the cognitive engine is configured to call a test case design program in the unstable state, the test case design program being configured to identify new requirement attributes or modified requirement attributes corresponding to the unstable state and transform said new requirement attributes or modified requirement attributes into human readable indicia corresponding to a new test case configured to remedy the unstable state.

In one embodiment, the cognitive engine is configured to reside on a server platform, and wherein the at least one requirements management tool or the at least one quality management tool are configured to reside on client computing devices.

In one version of the embodiment, the server platform is coupled to the client devices via at least one network.

In one version of the embodiment, the at least one network is selected from a group of networks including a LAN, WAN, a cloud computing arrangement, or a wireless network.

In another aspect of the invention, a method of tracking requirements in a software development project includes the steps of: providing initial software requirements, updated software requirements or new software requirements via at least one requirements management tool; providing initial test cases corresponding to the initial software requirements via at least one quality management tool; transforming the test cases and the initial software requirements into test case objects and requirement objects, respectively; linking the test case objects to corresponding requirements objects based on like attributes; providing a graphical representation showing the test case objects linked to the corresponding requirements objects; automatically updating the graphical representation in response to the updated software requirements or the new software requirements, the updated graphical representation corresponding to at least one updated test case or at least one new test case; and automatically disseminating the graphical representation or the updated graphical representation if the at least one updated test case or the at least one new test case exceeds a predetermined confidence threshold.

In one embodiment, the method further includes: semantically analyzing the updated software requirements or the new software requirements to identify requirement attribute changes; iterating the graphical representation or the updated graphical representation to determine which test cases are affected by the requirement attribute changes; and updating the graphical representation based on the requirement attribute changes.

In one embodiment, the updated software requirements or the new software requirements are transformed into updated requirement attributes and new requirement attributes, respectively, and wherein the updated requirement attributes and new requirement attributes are further transformed into human readable indicia corresponding to an updated test case or a new test case, the human readable indicia being disseminated to the at least one quality management tool.

In one embodiment, the at least one requirements management tool or the at least one quality management tool include display devices configured to display the graphical representation or the updated graphical representation.

In one version of the embodiment, the graphical representation is displayed as a nodal plot having requirement nodes linked to corresponding test case nodes by linking arcs, each linking arc representing at least one requirement attribute linked to at least one test case attribute.

One version of the embodiment further comprises the step of performing a propagation analysis to determine if the updated graphical representation is in a stable state.

In one version of the embodiment, the propagation analysis is depicted by providing a nodal indication that moves from node to node until the graphical representation settles into a stable state or remains in an unstable state.

In one version of the embodiment, the method further comprises the step of designing a suggested test case in the unstable state, the step of designing a suggested test case includes identifying new requirement attributes or modified requirement attributes corresponding to the unstable state and transforming said new requirement attributes or modified requirement attributes into human readable indicia corresponding to a new test case configured to remedy the unstable state.

In one embodiment, the method further includes the step of providing the at least one updated test case or the at least one new test case to a quality manager tool, the quality manager tool being configured to validate the at least one updated test case or the at least one new test case based on the predetermined confidence threshold, the quality manager tool being further configured to provide an updated predetermined confidence threshold.

In yet another aspect, the present invention is directed to a computer program product for tracking requirements in a software development project, the computer program product including a non-transitory computer readable storage medium that stores program instructions. The program instructions include: monitoring requests from at least one software program, the at least one software providing initial software requirements, updated software requirements, new software requirements, or initial test cases corresponding to the initial software requirements; transforming the test cases and the initial software requirements into test case objects and requirement objects, respectively; linking the test case objects to corresponding requirements objects based on like attributes; providing a graphical representation showing the test case objects linked to the corresponding requirements objects; automatically updating the graphical representation in response to the updated software requirements or the new software requirements, the updated graphical representation corresponding to at least one updated test case or at least one new test case; and automatically disseminating the graphical representation or the updated graphical representation if the at least one updated test case or the at least one new test case exceeds a predetermined confidence threshold.

In one embodiment of the computer program, the program instructions further include: semantically analyzing the updated software requirements or the new software requirements to identify requirement attribute changes; iterating the graphical representation or the updated graphical representation to determine which test cases are affected by the requirement attribute changes; and updating the graphical representation based on the requirement attribute changes.

In another embodiment of the computer program, the updated software requirements or the new software requirements are transformed into updated requirement attributes and new requirement attributes, respectively, and wherein the updated requirement attributes and new requirement attributes are further transformed into human readable indicia corresponding to an updated test case or a new test case, the human readable indicia being disseminated to the at least one quality management tool.

In another embodiment of the computer program, the step of automatically disseminating the graphical representation or the updated graphical representation includes providing the graphical representation or the updated graphical representation to one or more display devices.

In one version of the embodiment of the computer program, the graphical representation is displayed as a nodal plot having requirement nodes linked to corresponding test case nodes by linking arcs, each linking arc representing at least one requirement attribute linked to at least one test case attribute.

In one version of the embodiment of the computer program, the instructions further include the step of performing a propagation analysis to determine if the updated graphical representation is in a stable state.

In one version of the embodiment of the computer program, the propagation analysis is depicted by providing a nodal indication that moves from node to node until the graphical representation settles into a stable state or remains in an unstable state.

In one version of the embodiment of the computer program, the instructions further include the step of designing a suggested test case in the unstable state, wherein the step of designing a suggested test case includes identifying new requirement attributes or modified requirement attributes corresponding to the unstable state and transforming said new requirement attributes or modified requirement attributes into human readable indicia corresponding to a new test case configured to remedy the unstable state.

In another embodiment of the computer program, providing the at least one updated test case or the at least one new test case to the at least one software program, the at least one software program being configured to validate the at least one updated test case or the at least one new test case based on the predetermined confidence threshold, the quality manager tool being further configured to provide an updated predetermined confidence threshold.

In another embodiment of the computer program, the at least one software program is selected from a group of software programs including a client software program in a client-server arrangement, at least one requirements management software application, and at least one quality management software application.

Additional features and advantages of the invention will be set forth in the detailed description which follows, and in part will be readily apparent to those of ordinary skill in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
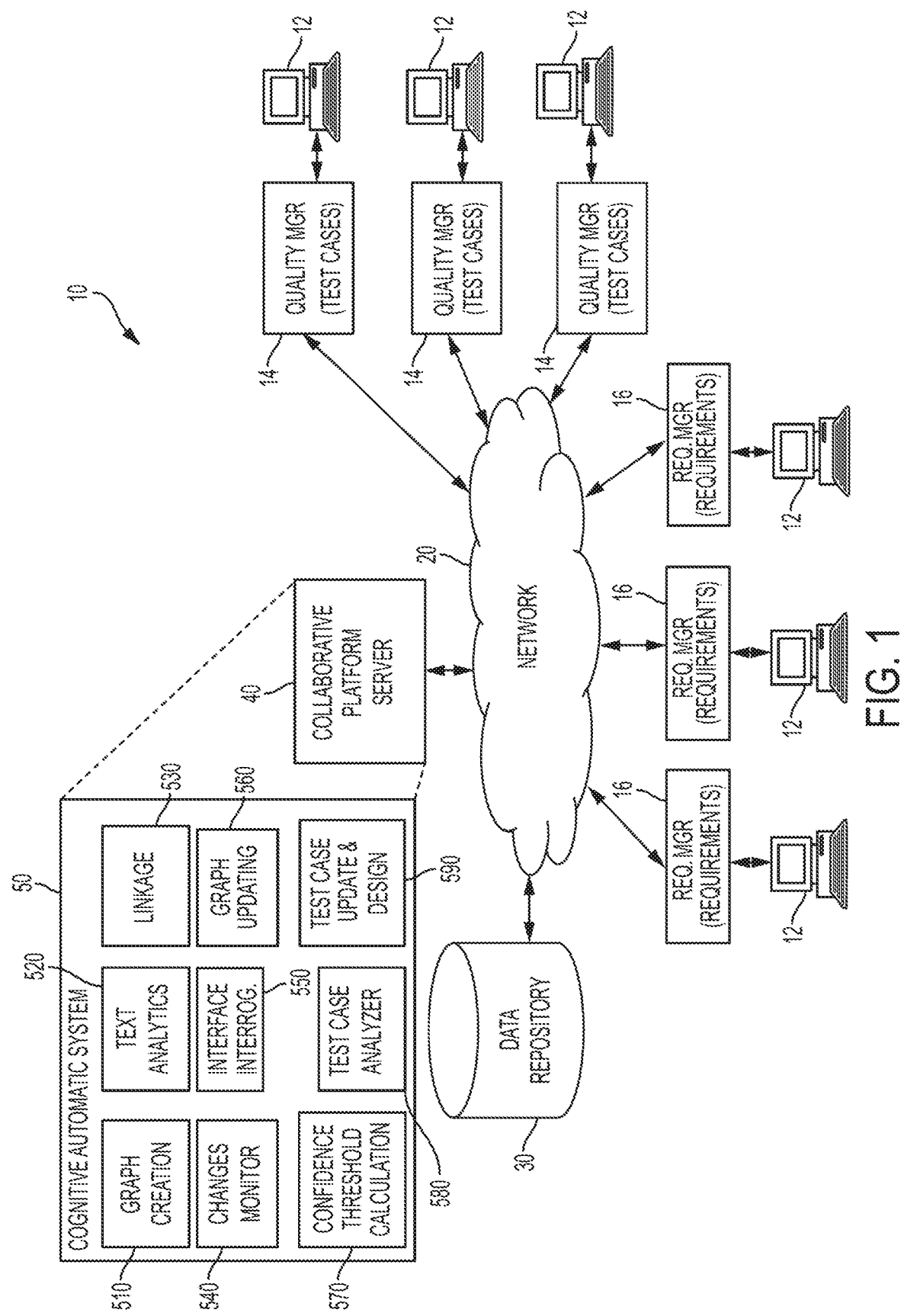
FIG. 1 is a block diagram of a tracking system in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system of the present invention is shown in FIG. 1, and is designated generally throughout by reference numeral 10.

As embodied herein, and depicted in FIG. 1, a block diagram of a tracking system 10 in accordance with the present invention is disclosed. The tracking system 10 may be implemented using any suitable arrangement of devices and computing tools 12 (such as source code editors, compilers/interpreters, build automation tools, and/or scripting editors). Thus, the tracking system 10 includes a network 20 configured to provide communications links between the various client devices 12 and the collaborative platform 40. In the example provided in FIG. 1, the collaborative platform 40 is implemented as a server computer that is connected to the network 20 and the data repository 30.

The tracking system 10 also includes a Cognitive Automatic System (CAS) 50 that may reside on the collaborative platform server 40 or some other server coupled to network 20. CAS 50 includes a number of software programs, or program components, which may be automatically employed by CAS 50, or used by the clients 12, to perform the tasks depicted in the flowcharts provided at FIGS. 2A-2C and described below in the related text.

For example, CAS 50 includes a graph creation program 510 that uses the test cases provided by the quality manager tool 14 and the requirements provided by the requirements manager 16 to generate the initial graph shows the various requirements and test cases in nodal form, i.e., each requirement and test case is portrayed as a nodal element in the graph. See, e.g., FIGS. 3A-3B. The graph creation program 510 can operate in conjunction with the text analytics program 520 and the linkage program 530 to derive the initial graph for the project. The graph creation program 510 may be configured to employ Watson technology to configure a preliminary graph or initial graph. Watson is a product of the International Business Machines Corporation in Armonk, N.Y.

Once the system analysts draft the requirements and the testers draft the test cases—which are typically stored in project documentation—the text analytics program performs a topic extraction procedure (e.g., "the number of products a user can place in a virtual shopping cart"). The text analytics program 520 includes, or uses, a semantic analyzer to analyze all of the requirements (16) and test cases (14) to identify the various objects or attributes of a given topic. Then, the linkage component 530 can perform a cluster analysis to identify which requirement and test case attributes are linked to a given topic. The attributes are used by the linkage component 530 to link the nodal elements in the graph so that each test case is associated with one or more requirements based on their mutual objects.

CAS 50 further includes a changes monitor 540 that is called by either the CAS 50, or by the requirements manager 16, when one or more software requirements is modified or added by the requirements manager 16. The Changes Monitor 540 can also use the text analytics program 520—or another semantic analyzer—to analyze new requirements or requirement modifications to automatically identify new or changed requirements. Once new requirements or modified requirements are identified, the CAS 50 will call the interface interrogation program 550 to compare the most current version of the graph (See, e.g., FIG. 3A) to the changes identified by the changes monitor 540. When the interface interrogation program 550 finds that the most current version of the graph does not reflect the new or modified requirements, it will call the graph updating program 560.

The graph updating program 560, as its name suggests, is configured to modify the nodal graph so that the new or modified requirements are incorporated in the graph and linked to existing, modified or new test cases. (See, e.g., FIGS. 4A-4B). The graph updating program is also configured to propagate new or updated requirements through the requirement nodes to the related test case nodes (See, e.g., FIG. 3C) in order to determine if the current related test cases are able to satisfy the new or updated requirement. If so, the graph updating program 560 will provide the tester with a stabilized graph (e.g., FIG. 3A) or an unstable graph (FIG. 3C).

In performing this task, the graph updating program 560 can employ the confidence threshold calculator 570. The confidence threshold calculation component 570 determines if each nodal relationship (between a new or updated requirement and its associated test cases) illustrated by the graph is consistent with the existing, modified or new attributes (obtained from the graph and the new or modified requirements). If there is a lack of consistency, the confidence threshold calculator 570 feeds data (corresponding to the inconsistency) back to the graph updating program 560 so that the graph can be re-iterated. At the end of the process, a "stable" graph is obtained; i.e., each nodal relationship is consistent with the attributes of the requirements and test cases.

If the process described above (including programs 550, 560 and 570) indicates that the existing test cases cannot be modified to satisfy new or updated requirements, the CAS 50 will call the test case analyzer program 580; this program is configured to identify suggested test cases that may satisfy new or updated requirements. The test case analyzer program 580 calls the test case update & design component 590 to design new test cases based on test cases primitives and provide a message or signal to a test case manager via the quality manager application 14 so that tester can review and validate the new test cases as appropriate.

In one embodiment, the collaborative platform server 40 can be implemented using a Collaborative Lifecycle Management (CLM) server, which is a product of the International Business Machines Corporation in Armonk, N.Y. In this embodiment, the CAS 50—and the related programs 510-590 described above—may reside on the CLM server. As those of ordinary skill in the art will appreciate, the CLM combines requirements management, quality management, change and configuration management, project planning and tracking on a common unified platform. CLM thus offers in-context team collaboration, lifecycle traceability across disciplines, real-time planning and development intelligence for fact-based decision making. Of course, the CAS 50 may be configured to reside on the collaborative platform 40 or on another server computer (via network 20) depending on the implementation of the present invention.

The collaborative platform server 40 may provide data, such as boot files, operating system images, and applications to clients 12. These files are stored by the server in the data repository 30. The clients 12 may also store files in data repository 30.

The client devices 12 shown at the bottom of FIG. 1 are depicted as using a requirements manager tool 16 that is used by system analysts for requirements composing. Those of ordinary skill in the art will appreciate that any suitable requirements manager tool may be employed herein, but by way of example, the requirements manager tool 16 may be implemented using the Rational Requirements Composer, which is a product of the International Business Machines Corporation in Armonk, N.Y. In another embodiment, the requirements application may be implemented using the Rational DOORS Next Generation software application, which is also a product of the International Business Machines Corporation in Armonk, N.Y. In any event, the requirements manager 16 may provide a word processor or spreadsheet capabilities to the analyst community so that the requirements generated by one analyst may be transparent to others on the team. The requirements manager 16 may also be configured to provide concurrent editing and automated versioning (so that users can readily identify the latest version of the requirements). As a result, the requirements manager 16 increases traceability and visibility of requirements changes across the product lifecycle for faster impact assessment and better quality. Because the application 16 is coupled to the platform server 40 via network 20, all requirements are made available to other team members from a secure, central and accessible location.

The client devices shown on the right hand side of FIG. 1 are depicted as using a quality manager tool 14 that is used by "testers" to compose test cases. Those of ordinary skill in the art will appreciate that any suitable test case application may be employed herein, but by way of example, the quality manager tool 14 may be implemented using the Rational Quality Manager (RQM), which is also a product of the International Business Machines Corporation in Armonk, N.Y. The RQM application is software that may be used across virtually any platform and type of testing. This software helps teams share information seamlessly, use automation to accelerate project schedules and report on metrics for informed release decisions. In the example of FIG. 1, the testers are using RQM system to simultaneously view, understand, modify, share, report on, and otherwise manage test cases. (Those of ordinary skill in the art will appreciate that the RQM system may be employed to manage other project assets as well). As before, because the quality manager tool 14 is coupled to the platform server 40 via network 20, all test cases can be made available to other team members from a secure, central and accessible location.

The client devices 12 may be implemented using any suitable computing device such as workstations, personal computers, mobile computing or telephonic devices, PDAs, or other types of networked computing devices, etc.

Operating system software, system applications (including applications 14, 16), CAS 50 programs, the source code of the software product being developed, and other such data and software may be stored in the data repository 30. Moreover, the data repository 30 may be implemented by any suitable storage system known in the art, e.g., including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a single storage device, a tape library, an optical library, a network attached storage (NAS), etc.

The network 20 may be of any suitable type and may include various types of connections, such as wireline, wireless communication links, or fiber optic cables. Moreover, the tracking system 10 may include additional servers, clients, and other devices that are not shown in FIG. 1. In one embodiment, the network 20 may include the Internet; and thus, network 20 may access a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprised of thousands of commercial, government, educational and other computer systems that route data and messages.

In another embodiment, the network 20 may be implemented as any suitable network such as, for example, an intranet, a local area network (LAN), or a wide area network (WAN).

In yet another embodiment, the network 20 may be the "cloud", and configured to provide on-demand network access to a shared pool of configurable computing resources (e.g. networks, network bandwidth, servers, processing, memory, storage, applications, virtual machines, and services that can be rapidly provisioned and released with minimal management effort or interaction with a provider of the service). In this embodiment, the client devices 12 access the applications (14, 16, etc.) via a client interface (e.g., a web browser), but is not responsible for managing or controlling the cloud infrastructure (e.g., network(s), servers, operating systems, storage, or even individual applications). Moreover, the collaborative platform server 40 and the CAS 50 may be provided to the clients 12 via the cloud infrastructure.

Those of ordinary skill in the art will appreciate that the block diagram provided in FIG. 1 is intended as an example, and not as an architectural limitation for the present invention. For example, the system may be implemented using a client-server model as shown by way of example at FIGS. 5A-5B.

Figure 2A:
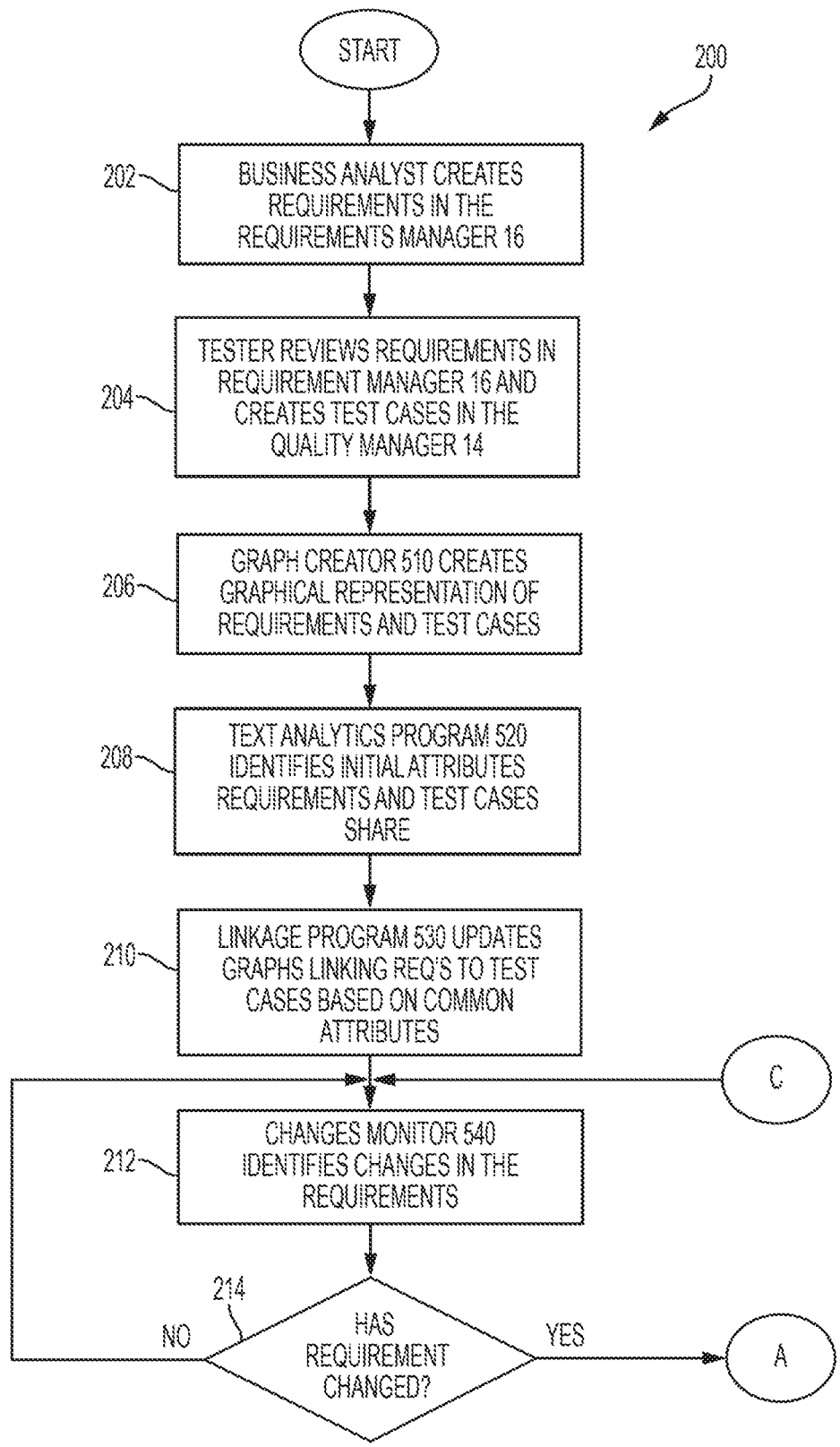
FIGS. 2A-2C are flow charts showing a method for automatically managing requirements and test cases within a software development project.
Figure 2B:
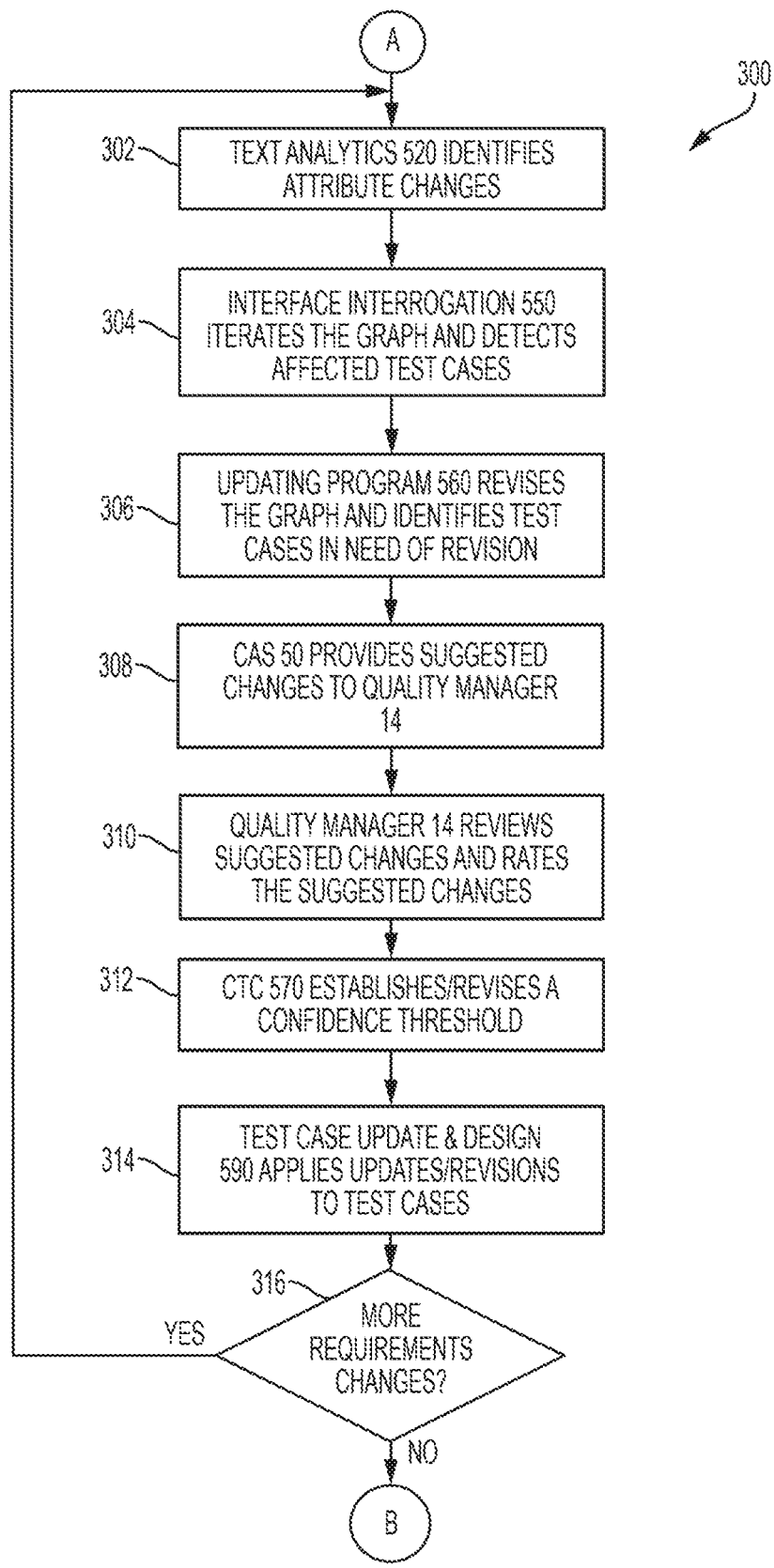
Figure 2C:
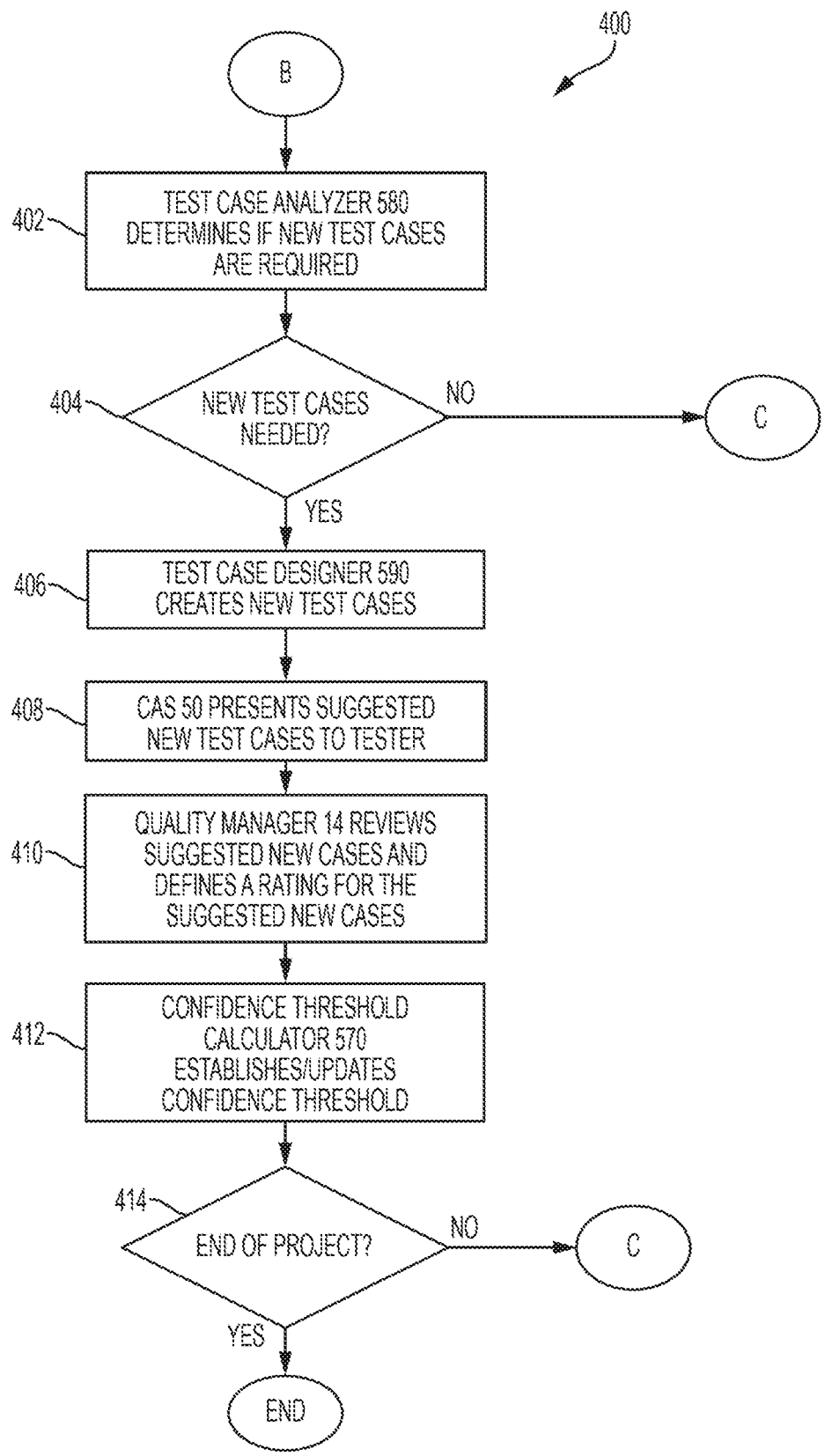

Referring to FIGS. 2A-2C, flow charts (200-400) showing a method for automatically managing requirements and test cases within a software development project are disclosed. In reference to FIG. 2A, the business analysts create the requirements for a software project in accordance with the software architecture, which is predicated on the client's requirements. The requirements are typically entered into the system as text documents. The CAS 50 may call the text analytics program 520 and the linkage program 530 to decompose the requirements into document objects. In another embodiment, CAS 50 may access another semantics analyzer program via network 20. The CAS 50 is further configured to classify the various objects based on software requirement topics.

In step 204, the tester community reviews the various requirements promulgated by the analysts (step 202) and creates test cases that are used to test the coded software that is created to satisfy a given requirement. Of course, the testers seek to create the least number of test cases that will do the job. As before, CAS 50 is configured to decompose the test cases into document objects by software topic. CAS 50 may be configured to obtain a template—organized by topic—from the requirements manager 16 for efficiencies sake. In any event, the tester document objects can be classified by software requirement topics.

In step 206, the CAS 50 calls the graph creator program 510 in response to receiving the initial batch of requirements and test cases from the requirements manager 16 and the quality manager 14. In one embodiment, the graph creator 510 is configured to organize the requirement document objects and the tester document objects from the requirements manager 16 and the quality manager 14, respectively. This may take the form of a template that organized by topic and subtopic (i.e., key concepts). In performing its function, the graph creator 510 employs the text analytics program 520 and the linkage program 530.

As noted above, the text analytics program 520 includes, or uses, a semantic analyzer to analyze all of the requirements (16) and test cases (14) to identify the various objects or attributes of a given topic. (An attribute is a software object, or data structure, that contains data organized in a field structure). The text analyzer 520 may create a listing of key words and phrases related to the topics and concepts (and another list of low value terms such as articles and the like). One aspect of this task is to determine the frequency of these terms and phrases. A stemming algorithm—such as Porter's stemming algorithm—may be employed to derive the root word or stem word for each object (e.g., "say" for save, saved, saving, etc.). Another aspect of this task is to determine the proper sense of a word or phrase based on a "parts-of-speech" analysis (e.g., is it a noun or a verb?). Yet another aspect of the text analytics program 520 may be to determine relationships between key entities gleaned from the project documentation. Finally, the text analytics program 520 may obtain definitional information or extract attribute data from a searchable data base (e.g., residing in the data repository 30) in order obtain definitional data.

After the text analytics program 520 breaks the requirements and test cases into objects, the graph creator can call the linkage component 530. The linkage component 530 may be configured to perform a cluster analysis to identify which requirement and test case attributes are linked to a given topic or concept. As noted, each attribute may be thought of as a data structure that is organized in parameter fields. Thus, the linkage component 530 compares the various parameters to identify linkages between requirement objects and test case objects for a given topic and/or concept.

Once the graph creator program 510 obtains the list of linked requirement objects and test case objects, it is configured to create a graph that includes each and every requirement and test case, and includes edges (i.e., linking lines or arcs) that connect (i.e., link) the nodal elements in the graph so that each test case is associated with one or more requirements based on their mutual attributes.

In step 212, the CAS 50 calls the changes monitor 540 in response to a change in the requirements (from requirements manager 16) or because of an identified need for new test cases (see step 404 in FIG. 2C). If both of these inputs are negative (i.e., there are no new requirements changes and there is no identified need for new test cases), then CAS 50 cycles in a loop between steps 212 and 214. Once CAS 50 receives a requirement change, then the processing moves on to step 302.

Referring now to FIG. 2B, CAS 50 calls the text analytics program 520 which again employs a semantic analyzer to analyze all of the new requirements provided by the requirements manager application 16. As before, the text analytics program 520 identifies the various objects or attributes of a given topic. (An attribute is a software object, or data structure, that contains data organized in a field structure). Next, the CAS 50 calls the interface interrogation program 550 which is configured to use the objects gleaned from the new requirements in order to determine which test cases are affected by the requirements change(s).

These changes are provided to the graph updater program 560. As noted above, this program is configured to propagate the requirements through the graph and identify those test cases in need of revision.

The graph updater program 560 operates on a set of requirements (i.e., $R=\{r_1, r_2, \ldots, r_n\}$, where n is the number of requirements and $p_i$ represents the i-th requirement) and a set of test cases (i.e., $T=\{t_1, t_2, \ldots, t_m\}$, here m is the number of test cases and $t_j$ represents the j-th test case). Program 560 also employs a requirement similarity matrix ($S_r$) of size n×n with its (i, j)-th entry representing the similarity between $r_i$ and $r_j$. Program 560 further operates on a test case similarity matrix ($S_t$) of size m×m with its (i, j)-th entry representing the similarity between $t_i$ and $t_j$. Moreover, R is a requirement-test case prior association matrix of size n×m with its (i, j)-th entry representing the prior association between $r_i$ and $t_j$.

A composite (n+m)×(n+m) requirement-test case similarity matrix A can then be formed by concatenating the three matrices as A=[SrRTRSt]. For each test case t, a corresponding effectiveness vector $y=[y_1, y_2, \ldots, y_n, y_{n+1}, \ldots, y_{n+m}]^T$ can be constructed. Note that: $y_k=1$ (k=1, 2, . . . , n) if t is an effective test for requirement k; $y_k=1$ (k=n+1, n+2, . . . , n+m) if t is the (k-n)-th test case; and $y_k=0$ otherwise. Accordingly, the effectiveness vector for each test case is like a "label" vector on a heterogeneous graph (e.g., FIG. 3A), where it has nonzero entries if the test case is effective for the corresponding requirement nodes or is the node itself (for test case nodes). The graph updater program 560 is thus configured to predict the values of those zero entries (for a requirement node) in order to determine whether a particular test case will be effective for it or not.

The graph updater program 560 also concatenates all of the effectiveness vectors for the m test cases so that a test case effectiveness matrix $Y=[y_1, y_2, \ldots, y_m]$ can be formed. Thus, the graph updater program 560 provides a label propagation procedure that spreads the label information in Y over the entire graph so that requirements propagate their known effective test cases to other requirements based on the requirement similarity analytics. Moreover, the test cases simultaneously propagate their target requirements to other test cases based on the test case similarity analytics to derive the relevance between nodes until achieving a steady state. After label propagation, label matrix F can be obtained by a formula $F=(1-\mu)(I-\mu W)^{-1} Y$. F is the probability that a test case is effective for a given requirement. W is a normalized form of the similarity matrix A, and 0<μ<1, where μ is a parameter that determines the influence of a node on a neighboring node.

The outcome of step 306 is either a stable updated graph, or an unstable graph that cannot satisfy the new or updated requirements. If the graph is found to be unstable, CAS 50 provides the quality manager tool 14 with a list of those test cases in need of revision and may also provide suggested changes to those test cases. In step 310, the tester reviews the suggested via the quality manager tool 14 and provides the CAS 50 with a rating for each test case. Based on that rating, the confidence threshold program calculates a confidence threshold. If the revised confidence threshold is acceptable, CAS 50 directs the quality manager tool 14 to apply the test case revisions (step 314). In step 316, CAS 50 queries the requirements applications 16 in order to determine if there are more requirement changes.

Referring to FIG. 2C, another source of an unstable graph relates to the need for one or more new test cases. Thus, CAS 50 calls the test case analyzer 580 to determine if new test cases are required in steps 402-404. After the graph fails to settle into a stable state, the analyzer 580 traces the source of instability to identify the relevant test cases from the trace, and determines if the new or updated requirements can be satisfied by modifying one or more of the existing test cases. If the answer is yes, the program is directed back to step 212 (FIG. 2A) and suggested test case changes are identified. (See FIG. 2B). If the answer is no, then the test case analyzer 580 finds that at least one new test case is required and CAS 50 calls test case design program 590 to design one or more test cases that satisfy the new or updated requirement.

In step 408, therefore, CAS 50 provides the quality manager tool 14 with the suggested new test cases generated by the test case designer 590. In step 410, the tester reviews the suggested test cases and provides the CAS 50 with a rating for each new test case. Based on that rating, the confidence threshold program calculates a confidence threshold. If the revised confidence threshold is acceptable, CAS 50 directs the quality manager tool 14 to apply the test case revisions and the project terminates or the program is redirected back to step 212 at FIG. 2A.

Figure 3A:
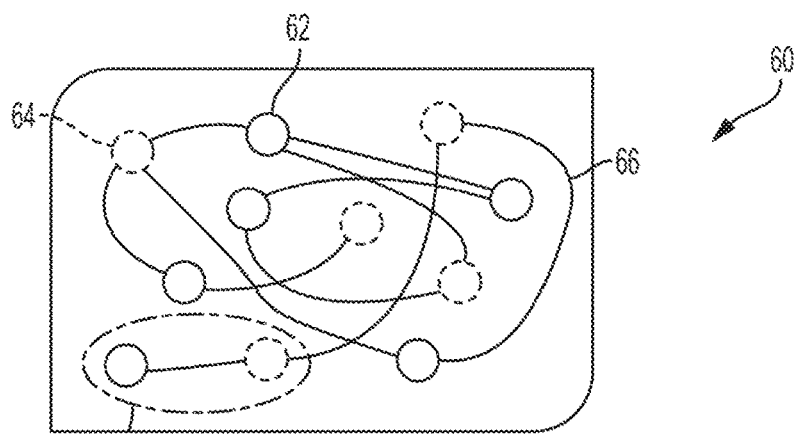
FIG. 3A is diagrammatic depiction of a graphical user interface showing a graph artifact representing the relationship between requirements and test cases within a given software development project.

As embodied herein and depicted in FIG. 3A, a diagrammatic depiction of a graphical user interface showing a graph artifact 60 representing the relationship between requirements and test cases within a given software development project is disclosed. During project initialization, a graphical representation 60 of all requirements 62 and test cases 64 is created. Each requirement 62 and test case 64 is instantiated as a node, and nodes may be grouped according to type wherein the difference between instances of a type is wholly described by different parameters. Alternately, an entirely different requirement or test case may require its own node type.

As shown in FIG. 3A, the graph 60 comprises requirement nodes 62 and (shaded) test case nodes 64. The requirement nodes 62 are connected to the test case nodes 64 by links (or sometimes known in the art as edges or arcs) 66. The links 66 represent common object or attribute parameters that are shared by certain requirements and the test cases developed to test or ensure that the software code meets that specific requirement. Thus, a tester or an analyst can quickly review the graph 60 and quickly gain an understanding of which test cases are being used to verify a given requirement.

Figure 3B:
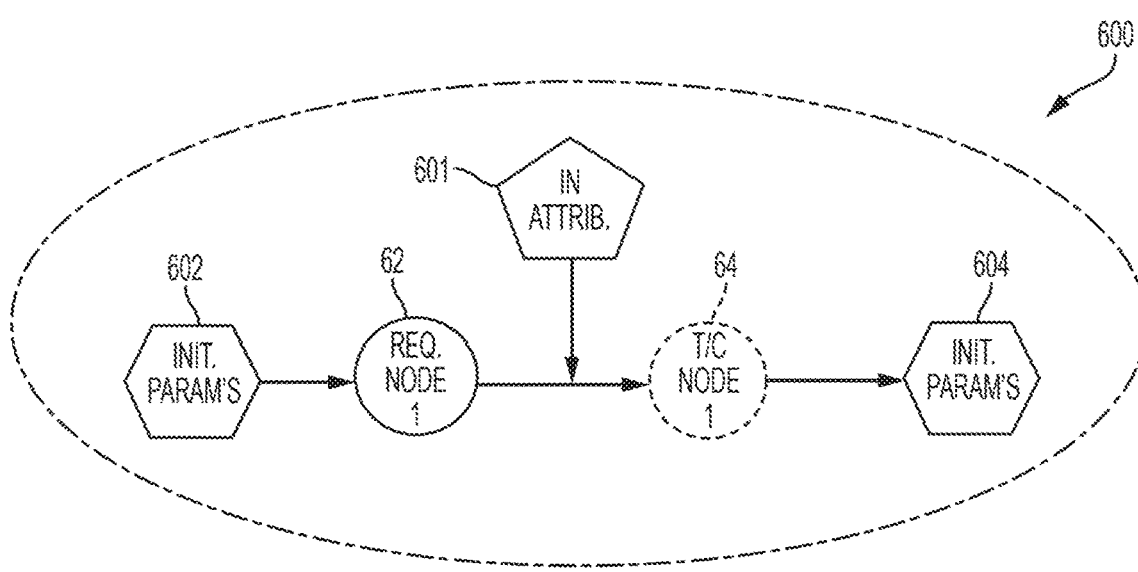
FIG. 3B is a detail view illustrating a nodal relationship between a particular requirement and test case depicted in FIG. 3A.
Figure 3C:
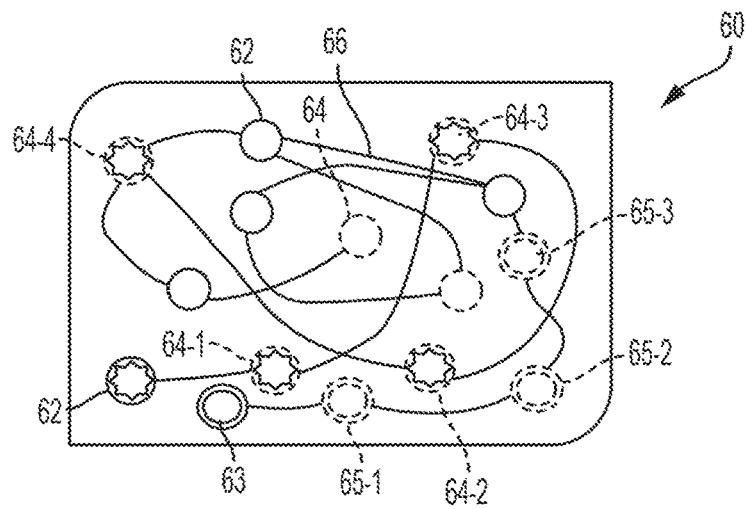
FIG. 3C is a detail view illustrating a nodal relationship between updated requirements and related test cases in an unstable state.

Referring to FIG. 3B, a detail view illustrating a nodal relationship between a particular requirement 62 and test case 64 depicted in FIG. 3A is disclosed. Typically nodal types are created in support (or possibly in expectation) of new interfaces into and from the graph 60. Each node (62, 64) is characterized by initialization parameters, depending on the topic or concept of the underlying documentation. Thus, the requirement node 62 is an object specified by initialization parameters 602 and the test case node 64 is an object specified by initialization parameters 604. The relationship between nodes 62 and 54 is parameterized by the "in-attribute" parameter set 601. Each relationship is unidirectional, but bidirectional relationships may also be represented by two connections. The interfaces chosen for each node are produced by the requirement node 62 and are "discovered" by the Test Case node 64 during graph initialization. Only those interfaces that the Test Case 64 node requires are used in a parameterized relationship connection 600 in the graph 60.

As explained above, the text analytics program 520 examines each requirement and test case descriptions in the project documentation to identify which node topic (or category) they may belong to (and determine which interfaces they will support). Again, topic extraction, followed by cluster analysis, is employed to map requirement 62 to either a single test case node 64, or to multiple test case nodes 64, in order to support all of the interfaces identified as topics.

If a node 62 combines interfaces in a unique way, or if certain topics appear to have no supporting interface, CAS 50 queries a user to configure a new node category via the requirements manager 16 or some other software tool coupled to the network 20. This technique simplifies the initialization of the graph 60 during project start up. As noted above, the text analytics program 520 may be configured to reference project encyclopedias stored in the data repository 30.

FIG. 3C is a detail view illustrating a nodal relationship between an updated requirement and related test cases in an unstable state; those of ordinary skill in the art will appreciate that any suitable propagation method can be employed in the present invention. Depending on how the graph is configured, therefore, multiple test cases may satisfy a requirement, either by linear propagation through the graph, parallel propagation, or by iterative propagation. Another outcome of this process is the identification of test cases in need of revision. Thus, when the graph artifact 60 is iterated, requirements are able to propagate through nodes to test cases, and determine through interface relationships and propagation if the graph is "consistent." A consistent graph will settle into a stable state when iterated, indicating that each requirement 62 is "satisfied" by the relevant test cases 64 (i.e., the test cases 64 are sufficient to determine if the requirement has been met).

In FIG. 3C, for example, node 62 is stylistically shown as being illuminated or highlighted to indicate that its update is propagated to its test nodes 64-1-64-4 (also illuminated or highlighted). In this case, the graph fails to settle because the updated requirement cannot be satisfied by the existing test nodes 64-1-64-4. Alternatively, a new requirement node 63 is introduced based on the creation of a new requirement by manager application 16. CAS 50, using the programs and methods described above, generates test cases 65-1-65-3 that satisfy the new requirement 63.

For example, a test case node 64 may receive a "Maximum Number of Users Handled" interface from a requirement node 62. The test case node 64 is parameterized to accept this interface and is configured to test the maximum number of users. The test case 64 may be parameterized to test if the number of users is less than or equal to 10 users. If the "Maximum Number of Users" interface produces a value of 10, then the test case node 64 may consider the requirement satisfied, and the signal provided by the requirement is eliminated. If the test case 64 cannot satisfy this requirement, the signal may be propagated from the test case node to other test case nodes it is connected to and, ultimately, back to the originating requirement node. If none of the test case nodes 64 can satisfy the requirement, the graph will be unstable. Therefore, depending on how the graph is configured, multiple test cases may satisfy a requirement, either by linear propagation, parallel propagation, or iterative propagation through the graph 60.

Using the graph 60 as an artifact of project design allows a software development team to quickly identify problem areas that need adjustment when a requirement or test case is modified. These problem areas will result in a failure of graph iteration to settle into a stable state, and by tracing the source of this instability, a new test case can be added, or an existing one adjusted to satisfy the stability requirement. Note that an eigenvalue analysis of the graph could also determine if stability is achievable (for example if all eigenvalues were on the interval 0 . . . 1).

Referring to FIGS. 4A-4D, additional detail views illustrating updated nodal relationships between requirements and test cases after requirement modifications are disclosed. In the following FIGS. 4A-4D, some of the features and benefits of the tracking system of present invention are illustrated by showing how the tracking system can be employed during a software development project. In this example, the exemplary software-under-development is an online shopping system. Those skilled in the art will appreciate that the tracking system of the present invention may be used in conjunction with virtually any software under development. Thus, the present invention should be deemed as being limited to the instant example, or any other example presented herein. In this example, the online shopping system employs a shopper browsing and buying history to recommend other products to the customer; if the customer selects one or more of the products, they are added to the cart. In addition, the exemplary online shopping system has a product catalog that the customer can peruse and make selections from.

Figure 4A:
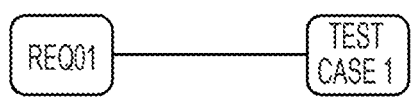
FIGS. 4A-4D are additional detail views illustrating updated nodal relationships between requirements and test cases after requirement modifications.

Referring now to FIG. 4A, therefore, in the initial version of the system documentation, the analysts promulgated the following requirement REQ01: "Title: Set a limit of the amount of products that client can add to the shopping cart. Description: Products should be added to the shopping cart by customer selection via a checkbox and clicking on the 'Add to the cart' button. The limit of products a client can add to the cart per single operation is equal to 25."

Upon receiving the requirement, the testers provided the following test case ("Test Case 1") to validate REQ01: Test Case 1: Title: Verify the limit of the amount of products that client can add to the shopping cart. Description: Products should be added to the shopping cart by selecting them via Checkbox and clicking on the 'Add to the cart' button. Steps: (1) Add 25 products and verify they are added successfully to the cart; (2) Add one more product and verify that the operation fails with a proper error message."

Thus, the nodal relationship shown in FIG. 4A is generated by the execution of steps 202-210 at FIG. 2A. As described herein, the changes monitor 540 cycles (steps 212-214) until one of more requirements are changed or added. Thus, in the second release, the first test case is modified and a new requirement REQ02 was added. "REQ01—(UPDATED) Title: Set a limit of the amount of products that client can add to the shopping cart. Description: Products should be added to the shopping cart by selecting them via Checkbox and clicking on the 'Add to the cart' button. The limit of products a client can add to the cart per single operation is equal to 50." "REQ02 (NEW)—Title: Add new products to the shopping cart individually. Description: Products can be added to the shopping cart by clicking individually on each item's unique 'Add to the cart' button."

Figure 4B:
Figure 4B:
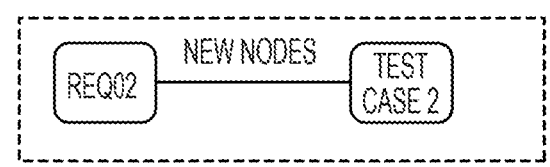

As shown in FIG. 4B, test case 1 is automatically updated; and in addition, CAS 50 proposes/generates a new test case for the requirement REQ02. Specifically, system 10 (e.g., FIG. 1) uses the methodology described herein (e.g., FIGS. 2A-2C) to update "Test Case 1: Title: Set a limit of the amount of products that client can add to the shopping cart (UPDATED). Description: Products should be added to the shopping cart by selecting them via Checkbox and clicking on the 'Add to the cart' button. Steps: (1) Add 50 products to the shopping cart and verify they are added successfully; and (2) Add one more product and verify that the operation fails with the proper error message." Moreover, system 10 (e.g., FIG. 1) also uses the methodology described herein (e.g., FIGS. 2A-2C) to add new Test Case 2: "Title: Add new products to the shopping cart individually (NEW). Description: Products can be added to the shopping cart by clicking individually on each item's unique 'Add to the cart' button. Steps: individually click on each item's unique "Add to Cart" button to test that each product is added per the requirement." Notice that the description in the Test Cases is the same as the description in the requirement. Those of ordinary skill in the art will appreciate that the testing software, e.g., Agile, can readily execute simplified test case language such as this. If the description in the Test Case is sufficiently clear, the testing software should be able to execute the Test Case.

Figure 4C:
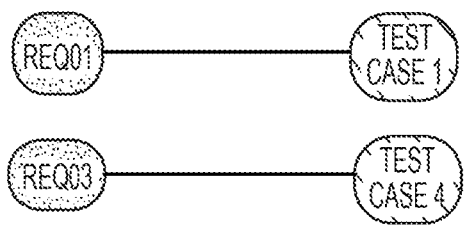
Figure 4D:
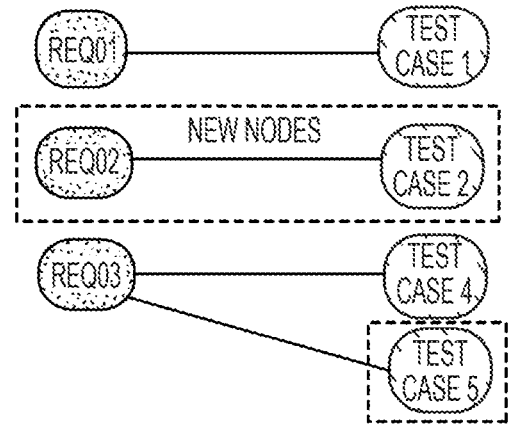

In reference to FIGS. 4C and 4D, the present invention is well equipped to verify more complex scenarios. During the initialization process (FIG. 2A), a business analyst could have added another requirement (REQ03) via manager 16. Specifically, the business analyst has created a table of product recommendations that correspond to a shopper's profile. These recommendations are captured in Table I and form the basis for REQ03.

TABLE I (REQ03):

| Product | Comp. Syst. (all models) | Monitor | Ext. HD | Speakers | Tablet | Prod. S/W | Phone | Printer | Education |
|---|---|---|---|---|---|---|---|---|---|
| Comp. Syst. (all models) | | X | X | X | | X | | X | |
| Monitor | X | | | | X | | | | |
| Ext. HD | X | | | | | X | | X | |
| Speakers | X | | | | X | | X | | |
| Tablet | | X | | X | | | X | | |
| Prod. S/W | X | | | | | | | | X |
| Phone | | | | X | | | | | |
| Printer | X | | X | | | | | | |
| Education | | | | | | X | | | |

Based on the shopper's rich profile—as depicted in Table I—the system must recommend products accordingly. As always, the tester must create a set of test cases to validate recommendations for each product. The Test Case 4 is shown in Table II:

TABLE II (Test Case 4)

| No. | Step | Expected Result |
|---|---|---|
| 1. | Navigate to product catalog and select a "computer system" | "Computer system" page is open showing all available systems |
| 2. | Select model "X" and click on "Add to the cart" button | Model "X" product is added to the shopping cart |
| 3. | Verify the right side panel and ensure the system has recommended the following products: monitor; External HD; Productivity Software; and Printer. | The recommended products are suggested to the shopper |
| 4. | Click the "Add to the cart" button below the "Productivity Software" | "Productivity software" is added and system recommends "Education" |

In FIG. 4C, the nodal graph (see FIG. 3A) shows the first requirement REQ01 described above in conjunction with FIG. 4A. However, this scenario adds a second requirement REQ03. Thus, the testers design Test Case 1 to verify REQ01 and Test Case 4 to verify REQ03. The nodal relationships generated by the graph 60 (FIG. 3A) thus include the additional nodes (REQ03, Test Case 4) depicted in FIG. 4C.

In the next release, the business analyst modifies REQ03 to add a new product to the catalog ("Wireless headphones") and remove a product ("Education") so the requirements matrix (Table I) is modified accordingly.

In reference to steps 212-214, CAS 50 detects the requirements changes. In reference to FIG. 4D, CAS 50 generates the graphical representation of the adaptation of the graph based on the changes to the requirements from version 1 to version 2.

Figure 5A:
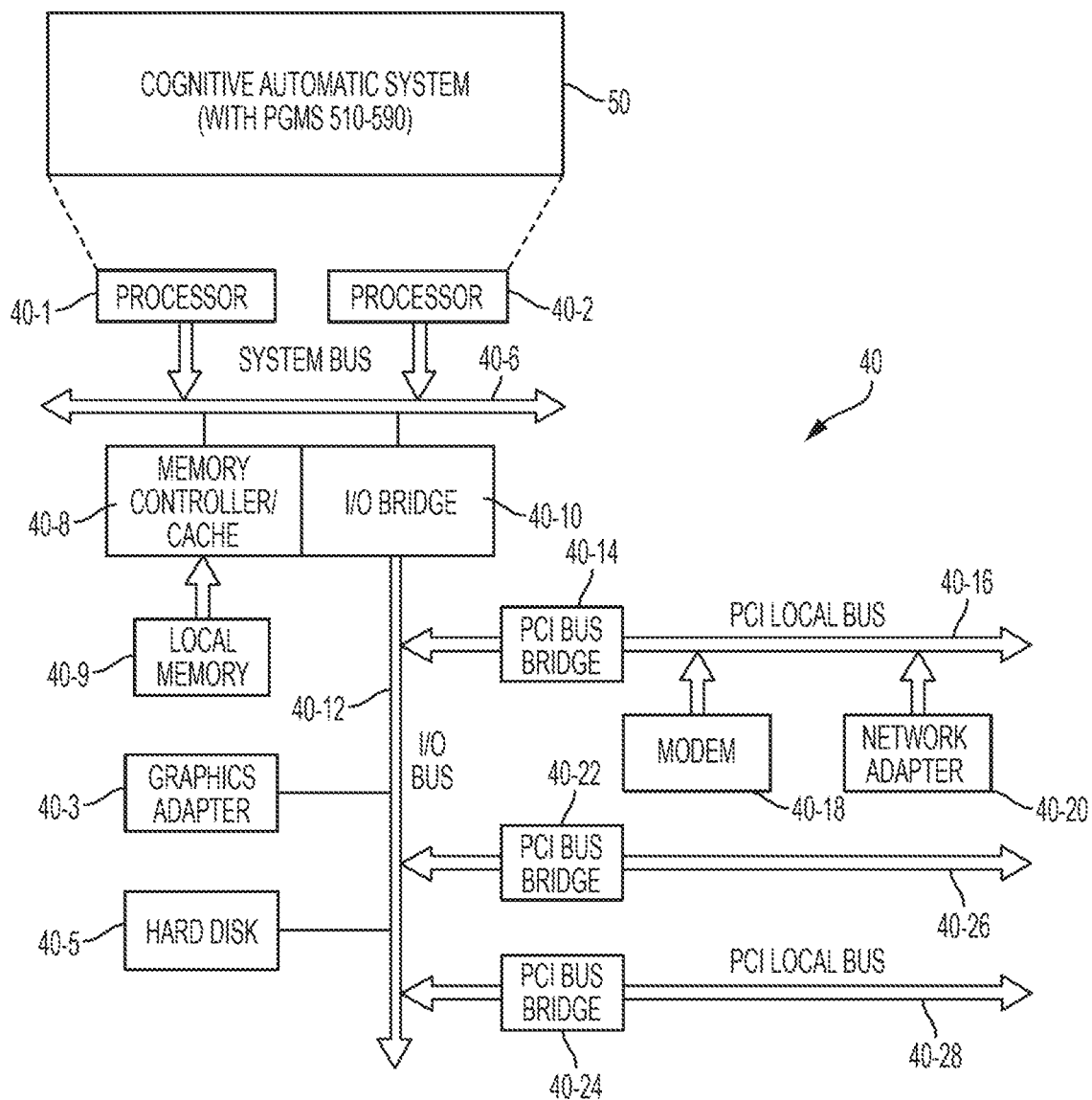
FIGS. 5A-5B are block diagrams showing an alternate implementation of the system depicted in FIG. 1.
Figure 5B:
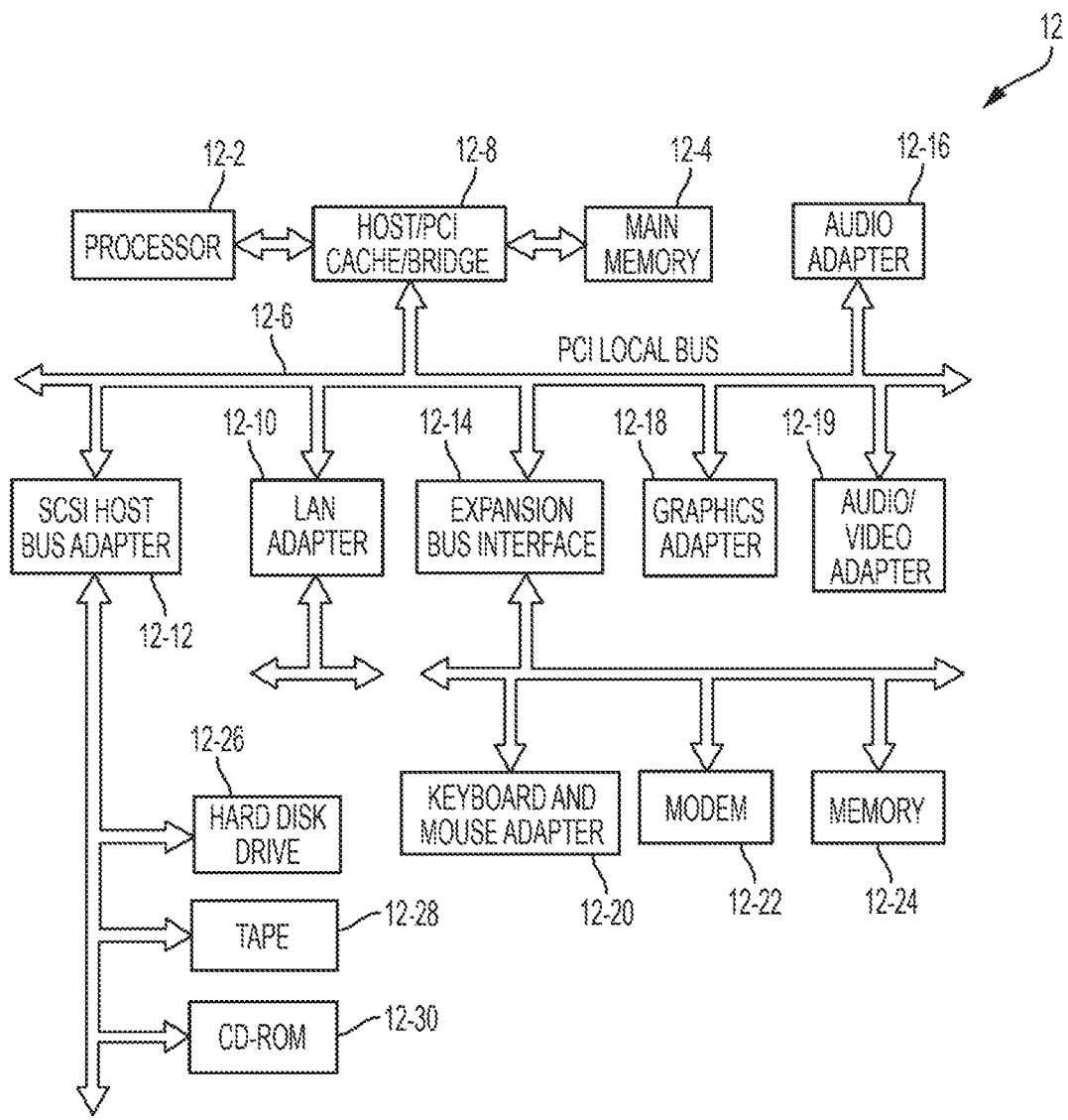

As embodied herein and depicted in FIGS. 5A-5B block diagrams showing an alternate implementation of the system depicted in FIG. 1 are disclosed. In this embodiment, CAS 50 is depicted as residing on server 40 of a client-server system that includes clients 12 (FIG. 5B).

Turning now to FIG. 5A, the tracking system 10 includes a server 40 that may be configured in any suitable manner. FIG. 5A shows, for example, a symmetric multiprocessor (SMP) system that features a plurality of processors (401-1, 40-2) that are connected to system bus 40-6. As those of ordinary skill in the art will appreciate, a single processor system may also be employed. Also connected to system bus 40-6 is memory controller/cache 40-8, which provides an interface to local memory 40-9. An I/O Bus Bridge 40-10 is connected to system bus 40-6 and provides an interface to I/O bus 40-12. Memory controller/cache 40-8 and I/O Bus Bridge 40-10 may be integrated as depicted.

The server 40 can also be configured to include a peripheral component interconnect (PCI) bus bridges (40-14, 40-22, 40-24, etc.). PCI Bridge 40-14 is connected to I/O bus 40-12 and thus provides an interface to PCI local bus 40-16. A number of modems 40-18 and/or network adapters may be connected to PCI local bus 40-16. Typical PCI bus implementations will support four PCI expansion slots or add-in connectors. Thus, communications links to clients 12 (in FIG. 5B) may be provided through modem 40-18 and/or network adapter 40-20 via PCI local bus 40-16 and the add-in connectors.

The server 40 may also be equipped with additional PCI bus bridges (40-22 and 40-24) to thus provide interfaces for additional PCI local buses (40-26, 40-28). These busses can be configured to accommodate additional modems or network adapters. Accordingly, the server may be connected to a multiplicity of client computers 12. The server 40 may be further equipped with a memory-mapped graphics adapter 40-3 and hard disk 40-5 by way of I/O bus 40-12.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention. The system depicted in FIG. 5A may be any suitable server system such as, for example, an IBM eServer p Series system, iSeries system, a product of International Business Machines Corporation in Armonk, N.Y., running the Advanced Interactive Executive (AIX) operating system or LINUX operating system.

Turning now to FIG. 5B, an example of a client computer is disclosed. In one embodiment, the client 12 may employ a peripheral component interconnect (PCI) local bus architecture 12-6. Although the depicted example employs a PCI bus 12-6, other bus architectures such as Accelerated Graphics Port (AGP) and Industry Standard Architecture (ISA) may be used. A processor 12-2 and main memory 12-4 can be connected to PCI local bus 12-6 through a PCI Bridge 12-8. PCI Bridge 12-8 also may include an integrated memory controller and cache memory for processor 12-2. Additional connections to PCI local bus 12-6 may be made through direct component interconnection or through add-in boards.

In the example depicted in FIG. 5B, a local area network (LAN) adapter 12-10, small computer system interface (SCSI) host bus adapter 12-12, and expansion bus interface 12-14 can be connected to PCI local bus 12-6 by direct component connection. On the other hand, an audio adapter 12-16, graphics adapter 12-18, and audio/video adapter 12-19 may be connected to PCI local bus 12-6 by add-in boards inserted into expansion slots. An expansion bus interface 12-14 provides a connection for a keyboard and mouse adapter 12-20, modem 12-22, and additional memory 12-24. The SCSI host bus adapter 12-12 provides a connection for hard disk drive 12-26, tape drive 12-28, and CD-ROM drive 12-30. Typical PCI local bus implementations can support three or four PCI expansion slots or add-in connectors.

The client 12 includes an operating system that is configured to run on processor 12-2 and is used to coordinate and provide control of various components coupled thereto. The operating system may be any suitable operating system including suitable commercially available operating systems (e.g., Windows XP, Windows Vista, Windows 7, Windows 8, Windows 10, etc.) which are available from Microsoft Corporation. An object oriented programming system such as Java may run in conjunction with the operating system and provide calls to the operating system from Java programs or applications executing on client 12. "Java" is a trademark of Sun Microsystems, Inc. Instructions for the operating system, the object-oriented programming system, and applications or programs are located on suitable memory storage devices for execution by processor 12-2.

Those of ordinary skill in the art will appreciate that the hardware shown in described in conjunction with FIGS. 1, and 5A-5B, may vary depending on the implementation. Other internal hardware or peripheral devices, such as flash read-only memory (ROM), equivalent nonvolatile memory, or optical disk drives and the like, may be used in addition to or in place of the hardware depicted herein. Also, the processes of the present invention may be applied to a multiprocessor data processing system.

In another embodiment, client 12 may be implemented as a stand-alone computing device configured to be bootable without relying on some type of network communication interfaces. In yet another embodiment, client 12 may be a personal digital assistant (PDA) device, which is configured with ROM and/or flash ROM in order to provide non-volatile memory for storing operating system files and/or user-generated data.

In any event, the example embodiments provided herein are not meant to imply any architectural limitations. For example, client 12 also may be a notebook computer or hand held computer in addition to taking the form of a PDA or a mobile phone. The client 12, as well as management tools 14 and 16 may also be realized using a kiosk or a Web appliance. Moreover, those of ordinary skill in the art will readily appreciate that the present invention, or aspects of the invention, can be realized in hardware, software, or a combination of hardware and software. Any kind of computer/server system(s)—or other apparatuses adapted for carrying out methods described herein—may be well suited to the present invention. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those of ordinary skill in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those of ordinary skill in the art will recognize, or be able to ascertain using no more than routine experimentation, many equivalents to the specific inventive embodiments described herein. There is no intention to limit the invention to the specific form or forms disclosed, but on the contrary, the intention is to cover all modifications, alternative constructions, and equivalents falling within the spirit and scope of the invention, as defined in the appended claims. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of tracking requirements in a software development project, the method comprising:
    providing at least one initial software requirement, updated software requirement, or new software requirement via at least one requirements management tool;
    providing initial test cases corresponding to the at least one initial, updated, or new software requirement via at least one quality management tool;
    transforming the test cases and the at least one initial, updated, or new software requirement into test case objects and requirement objects, respectively;
    linking the test case objects to corresponding requirements objects based on the mutual attributes; and
    automatically disseminating the graphical representation if the at least one new test case exceeds a predetermined confidence threshold,
    wherein the cognitive engine is configured to perform a propagation analysis to determine if the graphical representation is in a stable state,
    wherein the propagation analysis is depicted by providing a nodal indication that moves from node to node until the graphical representation settles into a stable state or remains in an unstable state, and
    wherein the cognitive engine is configured to call a test case design program in the unstable state, the test case design program being configured to identify new requirement attributes or modified requirement attributes corresponding to the unstable state and transform said new requirement attributes or modified requirement attributes into human readable indicia corresponding to a new test case configured to remedy the unstable state.

2. The method of claim 1, further comprising:
    semantically analyzing the at least one initial, updated, or new software requirement to identify requirement attribute changes; and
    updating the graphical representation based on the requirement attribute changes.

3. The method of claim 1, wherein the at least one initial, updated, or new software requirement is transformed into requirement attributes, and wherein the requirement attributes are further transformed into human readable indicia corresponding to a test case, the human readable indicia being disseminated to the at least one quality management tool.

4. The method of claim 1, wherein the at least one requirements management tool or the at least one quality management tool include display devices configured to display the graphical representation.

5. The method of claim 4, wherein the graphical representation is displayed as a nodal plot having requirement nodes linked to corresponding test case nodes by linking arcs, each linking arc representing at least one requirement attribute linked to at least one test case attribute.

6. The method of claim 1, further comprising the step of providing the test case to a quality manager tool, the quality manager tool being configured to validate the test case based on the predetermined confidence threshold, the quality manager tool being further configured to provide an updated predetermined confidence threshold.

7. A tracking system for a software program development, the tracking system comprising:
    at least one requirements management tool stored in a memory configured to provide at least one initial software requirement, updated software requirement, or new software requirement;
    at least one quality management tool coupled to the at least one requirements management tool, the at least one quality management tool stored in the memory being configured to generate a test case corresponding to the at least one initial, updated, or new software requirement, each test case configured to determine that the software program satisfies the at least one initial, updated, or new software requirement; and a cognitive engine coupled to the at least one requirements management tool and the at least one quality management tool, the cognitive engine stored in the memory being configured to: (1) transform the test case and the at least one initial, updated, or new software requirement into test case objects and requirement objects, respectively; (2) link the test case objects to the corresponding requirements objects based on the mutual attributes; and (3) automatically disseminate a graphical representation showing the test case objects linked to the corresponding requirements objects, if a test case effectiveness calculation exceeds a predetermined confidence threshold; and wherein the cognitive engine is configured to perform a propagation analysis to determine if the graphical representation is in a stable state, wherein the propagation analysis is depicted by providing a nodal indication that moves from node to node until the graphical representation settles into a stable state or remains in an unstable state, and wherein the cognitive engine is configured to call a test case design program in the unstable state, the test case design program being configured to identify new requirement attributes or modified requirement attributes corresponding to the unstable state and transform said new requirement attributes or modified requirement attributes into human readable indicia corresponding to a new test case configured to remedy the unstable state.

8. The tracking system of claim 7, wherein the cognitive engine further comprises:
a monitoring program stored in the memory being configured to semantically analyze the at least one initial, updated, or new software requirement to identify requirement attribute changes;
an iteration program stored in the memory configured to iterate the graphical representation to determine which test cases are affected by the requirement attribute changes; and a graph updating program configured to update the graphical representation based on the requirement attribute changes.

9. The tracking system of claim 8, wherein the cognitive engine further includes a test case program stored in memory being configured to transform the requirement attribute changes into human readable indicia corresponding to a suggested test case, the suggested test case being disseminated to the at least one quality management tool.

10. The tracking system of claim 7, wherein the at least one requirements management tool or the at least one quality management tool comprises a display device configured to display the graphical representation.

11. The tracking system of claim 10, wherein the graphical representation is displayed as a nodal plot having the requirement nodes linked to corresponding test case nodes by linking arcs, each linking arc representing a test case object linked to a corresponding requirement objects based on mutual attributes.

12. The tracking system of claim 7, wherein the cognitive engine is configured to reside on a server platform, and wherein the at least one requirements management tool or the at least one quality management tool are configured to reside on client computing devices.

13. The tracking system of claim 12, wherein the server platform is coupled to the client devices via at least one network.

14. The tracking system of claim 13, wherein the at least one network is selected from a group of networks including a local area network (LAN), wide area network (WAN), a cloud computing arrangement, the Internet, an intranet, wireline networks, wireless networks, or fiber optic networks.

* * * * *